US011890765B2

(12) United States Patent
Amis et al.

(10) Patent No.: US 11,890,765 B2
(45) Date of Patent: Feb. 6, 2024

(54) RETRACTABLE UTILITY KNIFE

(71) Applicant: The James Brand, Inc., Carlsbad, CA (US)

(72) Inventors: Samuel James Amis, Portland, OR (US); Austin Jacob Orand, Portland, OR (US)

(73) Assignee: The James Brand, Inc., Portland, OR (US)

( * ) Notice: Subject to any disclaimer, the term of this patent is extended or adjusted under 35 U.S.C. 154(b) by 428 days.

(21) Appl. No.: 17/173,344

(22) Filed: Feb. 11, 2021

(65) Prior Publication Data

US 2022/0250264 A1 Aug. 11, 2022

(51) Int. Cl.
*B26B 5/00* (2006.01)
*B26B 11/00* (2006.01)

(52) U.S. Cl.
CPC .............. *B26B 5/003* (2013.01); *B26B 11/00* (2013.01)

(58) Field of Classification Search
CPC ......... B26B 5/003; B26B 11/00; B26B 5/001; B26B 1/08
USPC ......... 30/165, 125, 162, 320, 334, 335, 336, 30/337, 338, 339, 340
See application file for complete search history.

(56) References Cited

U.S. PATENT DOCUMENTS 3,107,426 A 10/1963 Robinson, Jr.
3,453,729 A * 7/1969 Larson .................... B26B 5/001 30/162
3,708,881 A 1/1973 Bennett
3,888,002 A 6/1975 Graham
4,012,836 A 3/1977 Baer et al.
4,509,260 A * 4/1985 Gringer ................... B26B 5/001 30/162
4,635,309 A * 1/1987 Larsen ...................... B25F 1/04 30/162
5,099,578 A 3/1992 Jan
5,495,670 A 3/1996 Quinn
6,487,778 B1 * 12/2002 Gringer ................... B26B 5/003 30/162
6,513,246 B2 2/2003 Ping
6,948,250 B1 * 9/2005 Caiafa, Jr. ............... B26B 5/001 30/162
8,201,336 B2 6/2012 De
8,984,755 B2 3/2015 De
9,656,398 B2 5/2017 Wang
2002/0056198 A1 * 5/2002 Ping ........................ B26B 5/001 30/162
2010/0325899 A1 12/2010 Seber et al.
2014/0317936 A1 10/2014 Wu
2019/0224861 A1 7/2019 Bloch et al.

FOREIGN PATENT DOCUMENTS

WO 2014117174 A1 7/2014

* cited by examiner

*Primary Examiner* — Ghassem Alie
(74) *Attorney, Agent, or Firm* — Howard & Howard Attorneys PLLC

(57) ABSTRACT

A retractable utility knife includes a blade carrier having a control pin and a frame liner having a control track, the carrier moveable between a retracted configuration, and deployed configuration, and a removal/replacement configuration, the control pin retaining the blade to the carrier in the retracted configuration and deployed configuration, and the control track being arranged so that the control pin releases the blade from the carrier when in the removal/replacement configuration.

15 Claims, 17 Drawing Sheets

RETRACTABLE UTILITY KNIFE

FIELD OF THE INVENTION

The invention relates to a retractable utility knife, and more particularly, to a utility knife with a manual actuator arranged to place the blade in the retracted position, the deployed position and an intermediary position wherein the blade is readably changeable.

BACKGROUND

A utility knife is a bladed tool for general purposes that can be consistently carried on a person. A utility knife can be an important item to have on hand to be prepared for everyday tasks and for utility purposes. For example, a utility knife may find application in the workplace, in outdoor recreational or adventure activities, or in the construction industry. Common utility knives may include a retractable blade, and may be known as a Stanley knife, box cutter or by another name. Such utility knives are designed to be lightweight and easy to carry and use.

Utility knives are commonly used in outdoor recreational activities or adventure sports. A tool is routinely needed to cut rope, cord, wood material, or packaging material; to make markings; or may be applied in emergency or first aid applications. Utility knives are also commonly used in factories, warehouses, construction projects and other everyday situations where a tool is routinely needed to mark cut lines, trim plastic or wood materials, or to cut tape, cord, strapping, cardboard, fabric or other packaging materials.

Retractable utility knives typically feature metal or plastic housing or frame components enclosing a blade carrier movable between retracted and deployed positions. The blade itself is a consumable, replaceable component of the utility knife that features a single sharpened edge. Conventional utility knives typically require disassembly of the housing or frame components in order to access the blade carrier, remove the used, dull blade, and install a new, sharp blade. Other designs may require the actuation of buttons, switches, or levers to disengage a retaining mechanism in order to release the blade from the tool for replacement.

Therefore, there is a need in the art of retractable utility knives with improved operation for controlling retraction or deploying the blade and for releasing and replacing replaceable blades.

DETAILED DESCRIPTION

Figure 1:
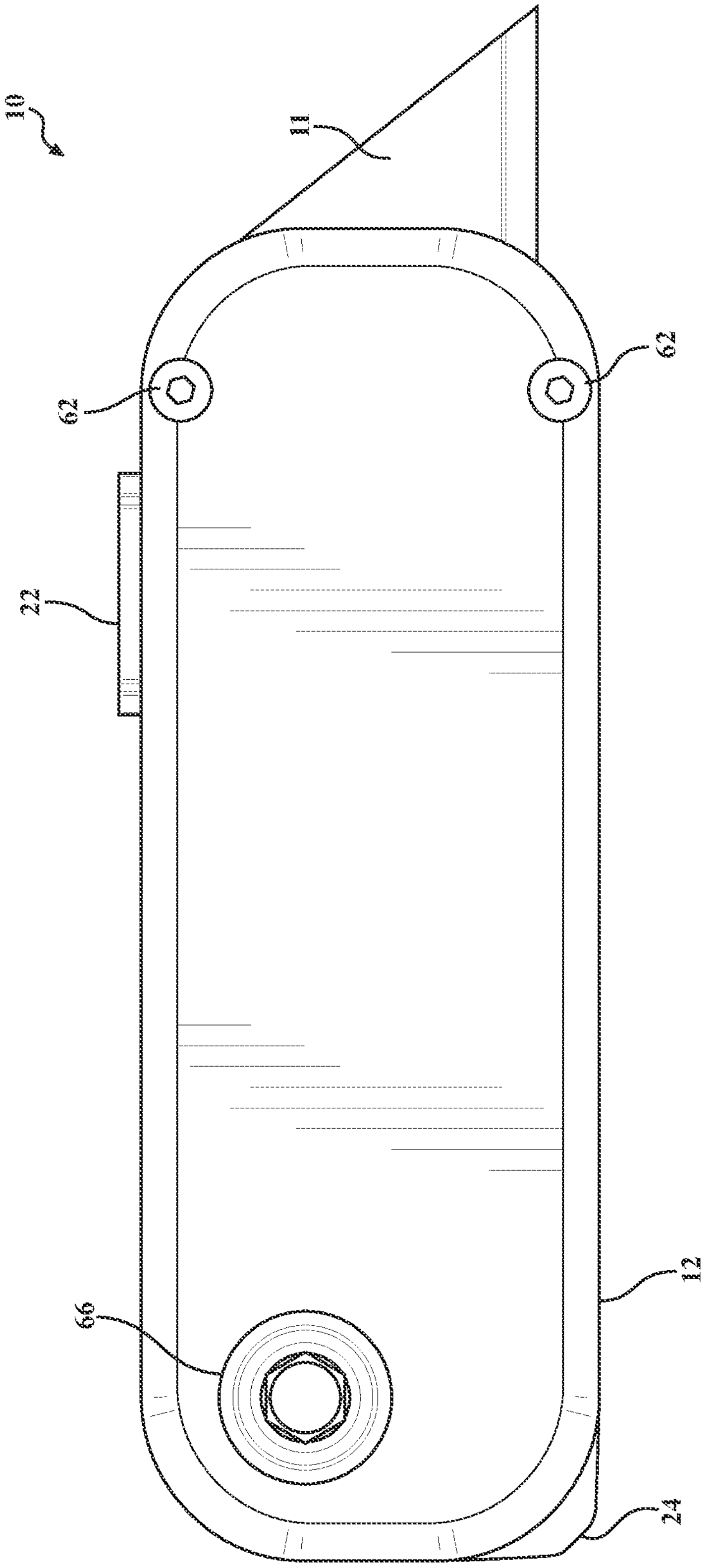
FIG. 1 is a side view of a retractable utility knife showing in a deployed configuration.

With references to FIGS. 1 through 7, a retractable utility knife 10 is illustrated. In FIG. 1, the retractable utility knife 10 is shown in a side view with a replaceable blade 11 extended from the handle in a deployed configuration. The handle is made up of a first scale 12 enclosing one half of the retractable utility knife 10 and a corresponding second scale 14 enclosing the opposite half. The first and second scales 12, 14 form the outer housing of the retractable utility knife 10 and serve as the handle during application of the blade 11, encompassing an interior volume between the first and second scales 12, 14 that house the other components of the retractable utility knife 10.

Figure 2:
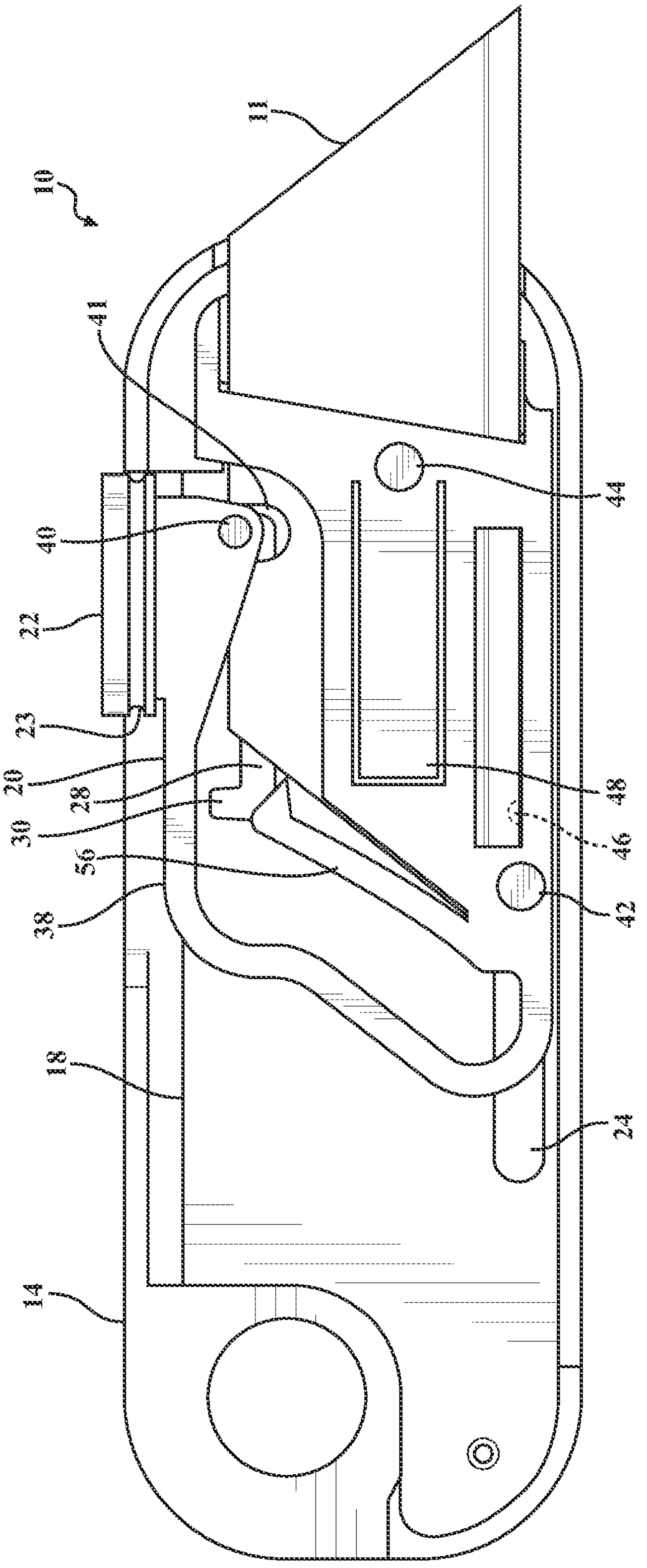
FIG. 2 is a side view of a partially assembled retractable utility knife shown in FIG. 1.

The first and second scales 12, 14 house and enclose the operative elements of the retractable utility knife 10. Within the first and second scales 12, 14 are first and second liners 16, 18 and a carrier 20. In FIG. 2, the first scale 12 and first liner 16 are removed from view, and the interior of the retractable utility knife 10 is illustrated showing the second scale 14, the second liner 18, the carrier 20, and the blade 11 in greater detail.

The carrier 20 includes a slider 22 by which the user can toggle the retractable utility knife 10 between different configurations. In a first configuration, the blade 11 is fully withdrawn into the retractable utility knife 10 and securely retained in position. This first, retracted configuration may be utilized during transportation or storage of the retractable utility knife 10. In a second configuration, as illustrated in FIGS. 1 and 2, the blade 11 is fully extended from the retractable utility knife and securely retained in position. This second, deployed configuration, may be utilized during application of the retractable utility knife 10 where the blade is being applied for the cutting of material. In a third configuration, the blade 11 is partially extended from the retractable utility knife 10, less than in the fully deployed configuration, and unsecured from the retractable utility knife. This third configuration may be utilized during removal and replacement of the blade 11.

The first and second scales 12, 14 may be formed of metal, plastic, or other suitable material using conventional methods known in the art. In some examples, the first and second scale 12, 14, may include a surface treatment or surface coating. In one example, the first and second scales 12, 14 may be formed of metal, such as steel, and include a surface treatment such as knurling, to provide a textured surface. In another example, the first and second scales 12, 14 may be formed of steel and include a surface coating of a rubberized paint that provides a high friction contact and protects the metal from environmental factors.

The first and second liners 16, 18 are disposed within the first and second scales 12, 14. The first and second liners 16, 18 interact with the carrier 20 to support the carrier 20 and to control the operation of the retractable utility knife 10. The first and second liners 16, 18 may be formed of metal, plastic or other suitable material using conventional methods known in the art. The first and second liners 16, 18 may provide additional structure to the retractable utility knife 10 in addition to the first and second scales 12, 14. For example, where the first and second scales are formed of a lower strength material, such as plastic, the first and second liners 16, 18, may be formed of metal to add strength and reinforcement to the retractable utility knife 10. In another example, the first and second liners 16, 18, may be formed of a lower strength material, such as plastic, where the first and second scales 12, 14 are formed of a high strength material and additional structural reinforcement is not required. In a further example, the first and second scales 12, 14 and the first and second liners may all be made of the same material. For high strength applications, the retractable utility knife 10 may feature all-metal construction of the first and second scales 12, 14 and liners 16, 18. For lower cost applications, the retractable utility knife 10 may feature all plastic construction of the first and second scales 12, 14 and liners 16, 18.

Figure 3:
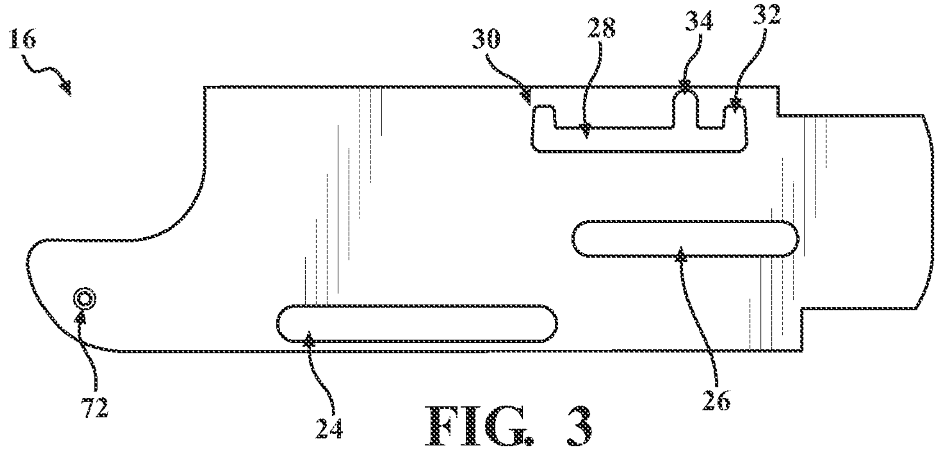
FIG. 3 is a side view of a liner of the retractable utility knife shown in FIG. 1.

FIG. 3 illustrates the first liner 16. The liners 16, 18 may be formed as a flat plate to be housed within the first and second scales 12, 14. The first and second liners 16, 18 include features for engaging with and for controlling disposition of the carrier 20 into one of the different configurations. For example, the liner 16 illustrated includes first and second guide tracks 24, 26, and control track 28. The control track 28 includes a retracted notch 30, at least one extended notch 32, and a removal/replacement notch 34. The first and second guide tracks 24, 26 and the control track 28 engage with features of the carrier 20 to facilitate operation of the retractable utility knife 10.

The second liner 18 (not pictured in FIG. 3) may be formed the same as the liner 16 so that the first and second liners 16, 18 both provide the same control track 28 and guide tracks 24, 26. In other alternatives, the second liner 18 may be formed differently from the first liner 16. For example, the second liner 18 may exclude the control track 28, or one or both of the guide tracks 24, 26. The second liner 18 may alternatively include a different arrangement or placement of guide tracks.

Figure 4:
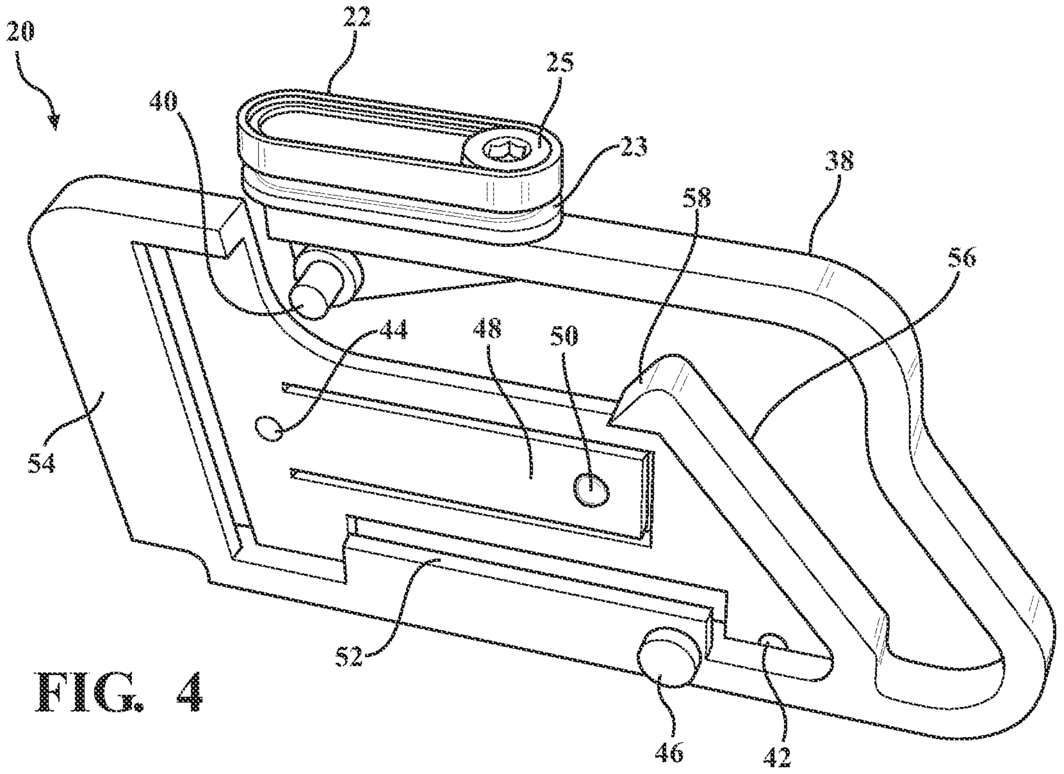
FIG. 4 is a perspective view of a blade carrier of the retractable utility knife shown in FIG. 1.
Figure 5:
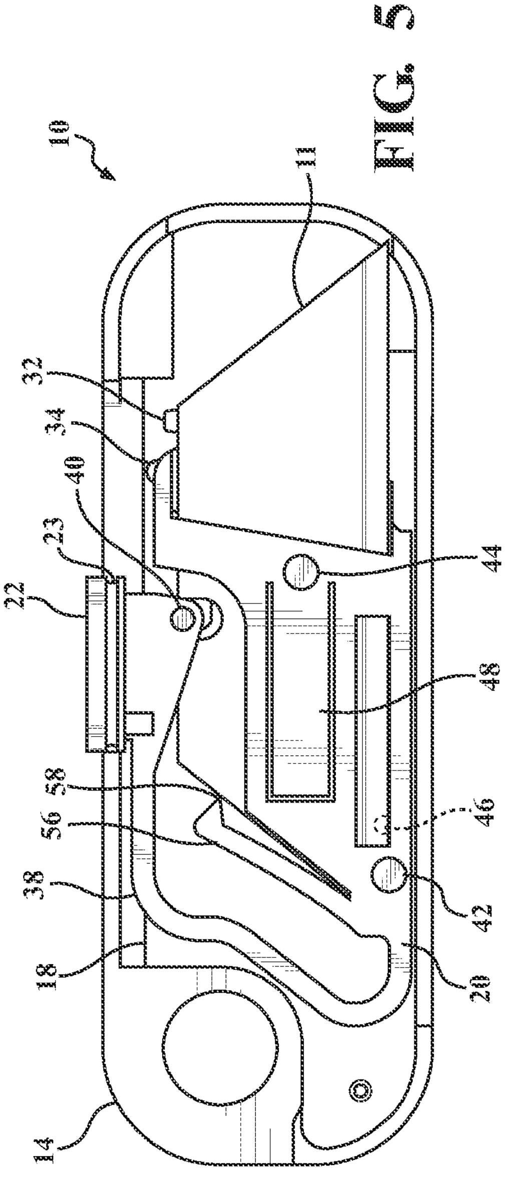
FIG. 5 is a side view of a partially assembled retractable utility knife in a retracted configuration.

The carrier 20 is illustrated in FIG. 4 and is arranged to receive and secure the replaceable blade 11 (not shown in FIG. 4) and to allow a user to toggle the retractable utility knife 10 between different operational configurations. The carrier 20 may be formed of a metal or plastic material using conventional methods. The carrier 20 supports the slider 22 on a spring arm 38, which may be formed integrally with the carrier 20. The slider 22 may be secured to the spring arm 38 via a threaded fastener 25 or other conventional methods. The spring arm 38 also supports a control pin 40. The control pin 40 may be formed of a metal or plastic material and secured to the carrier 20 using conventional methods. Alternatively, the slider 22, the control pin 40, or both, may be formed integrally with the spring arm 38.

The spring arm 38 is arranged so that the slider 22 extends from the first and second scales 12, 14 to be engaged by a user. The control pin 40 is supported on the spring arm 38 so as to move with the slider 22 upon the user applying a force to the slider 22 causing the spring arm 38 to deflect. The slider 22 may be depressed by a user against the biasing force of the spring arm 38. As illustrated in FIG. 4, the spring arm 38 biases the slider 22 upwards, and the user can apply a downward force against the slider 22. The slider 22 can be used by the user holding the retractable utility knife 10 to slide carrier 20 relative to the first and second liners 16, 18 for single handed operation to extend, retract, or release the blade 11.

The control pin 40 extends from spring arm 38 and into the control track 28 once assembled to the liner 16. In an arrangement where both the first and second liners 16, 18 include a control track 28, the control pin 40 may extend from the carrier 20 in opposing directions so as to simultaneously engage with both first and second liners 16, 18 once assembled to the first and second liners 16, 18. The biasing force of the spring arm 38 urges the control pin 40 in the direction of the retracted notch 30, extended notch 32 and removal/replacement notch 34. By applying a downward force to the slider 22 against the bias of the spring arm 38, the user can move the control pin 40 out of engagement with one of the notches 30, 32, or 34 and into the longitudinal extension of the control track 28. Continuing to apply the downward force and adding a longitudinal force component to the slider 22, the user can displace the carrier 22 relative to the liner 16, thereby moving the control pin 40 along the control track 28 from one notch 30, 32, or 34 to another notch 30, 32, or 34.

Figure 6:
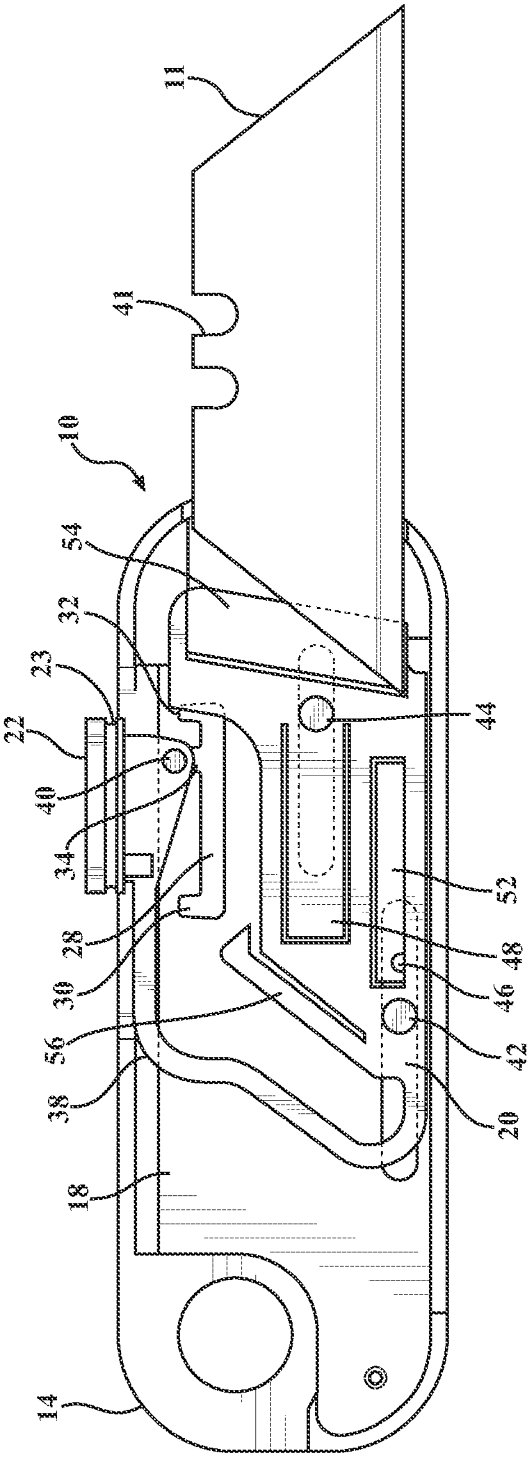
FIG. 6 is a side view of a partially assembled retractable utility knife in an intermediate configuration for removal/replacement of the blade.

Referring to FIG. 3, the depth of the retracted notch 30 and the extended notch 32 are the same, and the depth of the removal/replacement notch 34 is greater than the retracted and extended notches 30, 32, where the depth is measured as a distance from the longitudinal extension of the control track 28. The different depths of the retracted and extended notches 30, 32 from the removal/replacement notch 34 control the retention or release of the replaceable blade. As illustrated in FIG. 2, the carrier 20 is arranged so that the replaceable blade 11 can be received into the carrier 20 and, once received in the carrier 20, the control pin 40 is aligned with a notch 41 formed in the blade 11. The control pin 40 retains the blade 11 to the carrier 20 while the slider 22 is used to toggle the retractable utility knife 10 between the deployed configuration (illustrated in FIG. 2) and the retracted configuration (illustrated in FIG. 5). When the slider 22 is used to toggle the retractable utility knife 10 into the third configuration for removal and replacement of the replaceable blade 11, the control pin 40 is disposed in the removal/replacement notch 34. The removal/replacement notch 34, having a greater depth than the retracted and extended notches 30, 34, allows the control pin 40 to be removed from the blade notch 41, as illustrated in FIG. 6. Removing the control pin 40 from the blade notch 41 allows the replaceable blade 11 to be grasped by the user, removed from the retractable utility knife 10, and replaced with a new blade.

When disposed in the removal/replacement notch 34, the control pin 40 is removed from blade notch 41 by the further relaxing of the slider spring arm 38 allowed by the greater depth of the removal/replacement notch 34. In this configuration the slider 22 extends a greater amount outside the first and second scales 12, 14. The slider 22 may include an indicator 23 to signal to a user that the blade 11 is unsecured within the retractable utility knife 10. The indicator 23 may include a visual or tactile feature. For example, the slider 22 may be of a first color while the indicator 23 is of a contrasting color or other visually distinct color different from the first color of the slider 22. In another example, the indicator 23 may include a textured or distinct surface characteristic different from the portions of the slider 22 that remain exposed outside of the first and second scales 12, 14 in the retracted and deployed configurations. The texture or other surface characteristic may include a knurled band around the base of the slider, a region of high polish, or the like. In one example, the indicator 23 may include a groove in the slider 22 in which a brightly colored resilient insert, such as an elastic or rubber band, O-ring, or the like, is placed to provide both a visual and tactile indication.

The carrier 20 may include additional features to securely retain the blade 11 once installed. The carrier 20 may include a side biasing arm 48. The side biasing arm 48 may act as spring to bias against the side of the blade 11. The side biasing arm 48 be formed integrally with the carrier 20. The side biasing arm 48 may include a side bearing contact 50 to contact the blade 11 and urge the side biasing arm 48 out of its relaxed position when the blade 11 is installed to the carrier 20. The side biasing contact 50 may be formed integrally with the side biasing arm 48 or else may be installed via press-fit, threaded engagement, or other conventional methods. The side bearing contact 50 may include a low friction material or low friction coating to ease the installation and removal of the blade 11.

The side biasing arm 48 and side bearing contact 50 may urge the blade 11 against other features of the carrier 20 arranged to limit the movement or otherwise capture the blade against the force of the side biasing arm 48. For example, the carrier 20 may include a first side plate 52, a second side plate 54, or, as illustrated in FIG. 4, both first and second side plates 52, 54. The first and second side plates 52, 54 may be formed integrally with the carrier 20. The blade 11 may be securely positioned side-to-side in the carrier 20 by the force of the side biasing arm 48 through the side bearing contact 50 in combination with the first and second side plates 52, 54.

The carrier 20 may include a rear biasing arm 56 to aid in positioning the blade 11 longitudinally within the retractable utility knife 10. The rear biasing arm 56 may be formed integrally with the carrier 20. The rear biasing arm 56 may extend in a cantilevered fashion from a base of the carrier 20 to a rear contact 58 that contacts a rear surface of the blade 11 once installed. The rear biasing arm 56 may maintain a forward force against the blade 11. The control pin 40 extending through the blade notch 41 prevents the force applied by the rear biasing arm 56 from driving the blade 11 out of the retractable utility knife 10.

The carrier 20 may engage with the first and second liners 16, 18 other than via the control pin 40 and the control track 28. The carrier 20 may include one or more guides 42, 44, 46, which may be press-fit pins or studs, to engage with one or more guide tracks 24, 26 provided in the first or second liners 16, 18. The combination of the one or more guide 42, 44, 46 and the one or more guide tracks 42, 44 may aid in maintaining the relative relationship between the carrier 20 and the first and second liners 16, 18; and may aid in ensuring linear movement of the carrier 20 relative to the liners 16, 18 when toggling the retractable utility knife 10 between the deployed and retracted configurations.

Figure 7:
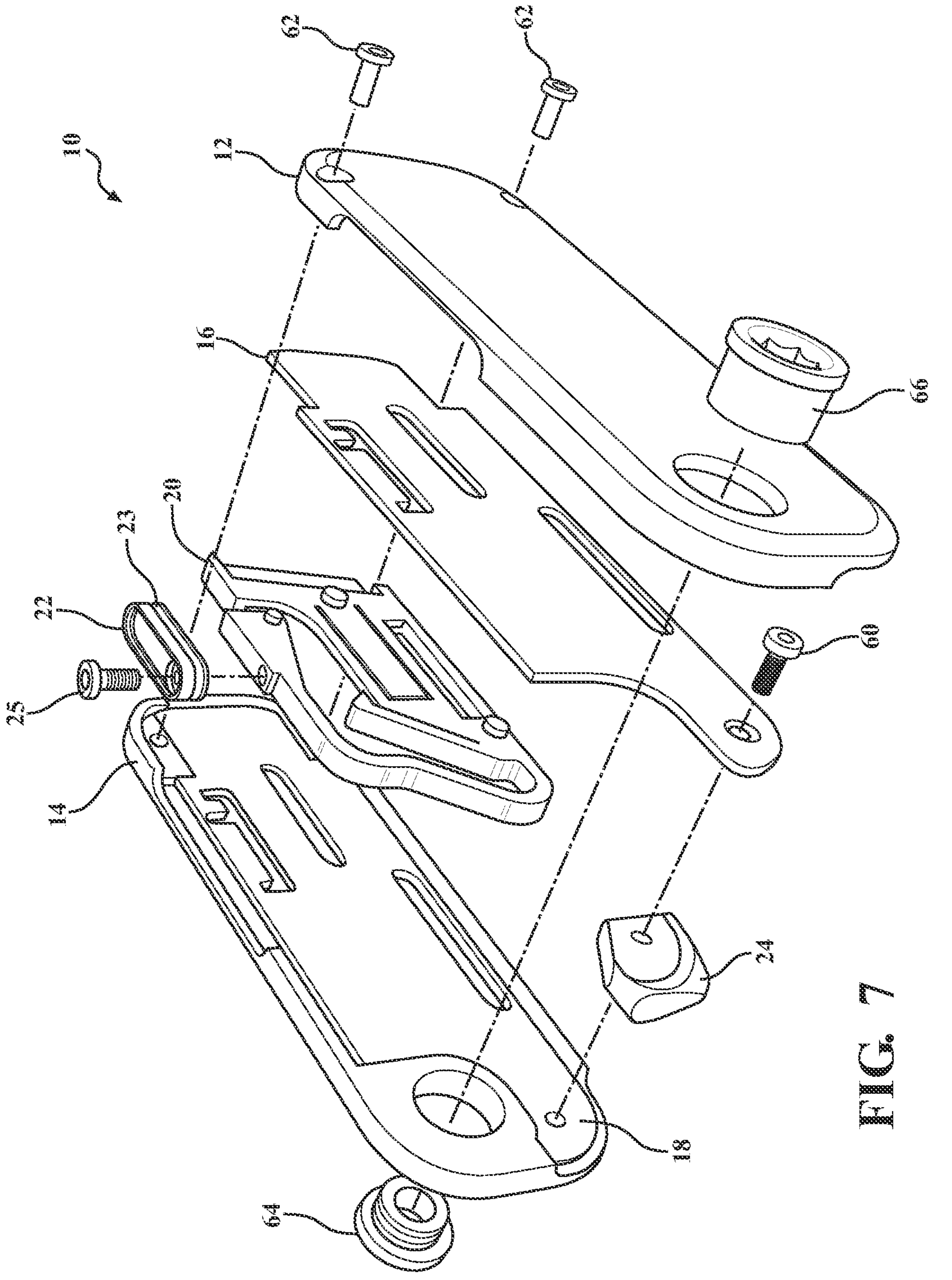
FIG. 7 is an exploded perspective view of a retractable utility knife.

Referring now to FIG. 7, an example assembly of a retractable utility knife 10 is shown in an exploded view. The first and second scales 12, 14 form the exterior of the retractable utility knife 10, enclosing the first and second liners 16, 18 and the carrier 20 within an interior space formed by the scales 12, 14. The scales 12, 14 may be fastened together directly via threaded fasteners 62. In one example, the first scale 12 at a first end may be formed with through-holes for the threaded fasteners 62 where the second scale 14 at the first end is formed with threaded holes for receiving and securing the threaded fasteners 62. In another example, both first and second scales 12, 14 are provided with through-holes, and a corresponding nut (not shown) is provided for securing the threaded fasteners 62.

The scales 12, 14 may be fastened together with a pass-through fastener arrangement including a bolt 64 and nut 66. The scales 12, 14 may be formed with an opening at a second end to receive the bolt 64 and nut 66, where the bolt 64 and nut 66 each include a pass-through opening, for example, for receiving a lanyard or split-ring. The bolt 64 and nut 66 may each be provided with an internal hex pocket for receiving an Allen wrench, or other hex driver. Alternatively, the bolt 64 and nut 66 may be provided with external hex surfaces for engaging a hex nut driver, box wrench or the like.

The retractable utility knife 10 may be provided with an auxiliary tool 24. The auxiliary tool 24 may be secured between the liners 16, 18 via a liner screw 60 or the like. The liner screw 60 may interface with threaded holes 72 provided in the first and second liners 16, 18. The auxiliary tool 24 may act as a spacer to help maintain alignment of the liners 16, 18 adjacent the carrier 20. For example, the auxiliary tool 24 may prevent binding of the carrier between the liners in the retracted configuration due to over tightening of the bolt 28 and nut 26. The auxiliary tool 24 may extend from between the liners 16, 18 to the exterior of the scales 12, 14. The auxiliary tool 24 may terminate in a blunt edge, for example, as a flat-bladed screwdriver, prying edge, or chisel-type edge.

Figure 8:
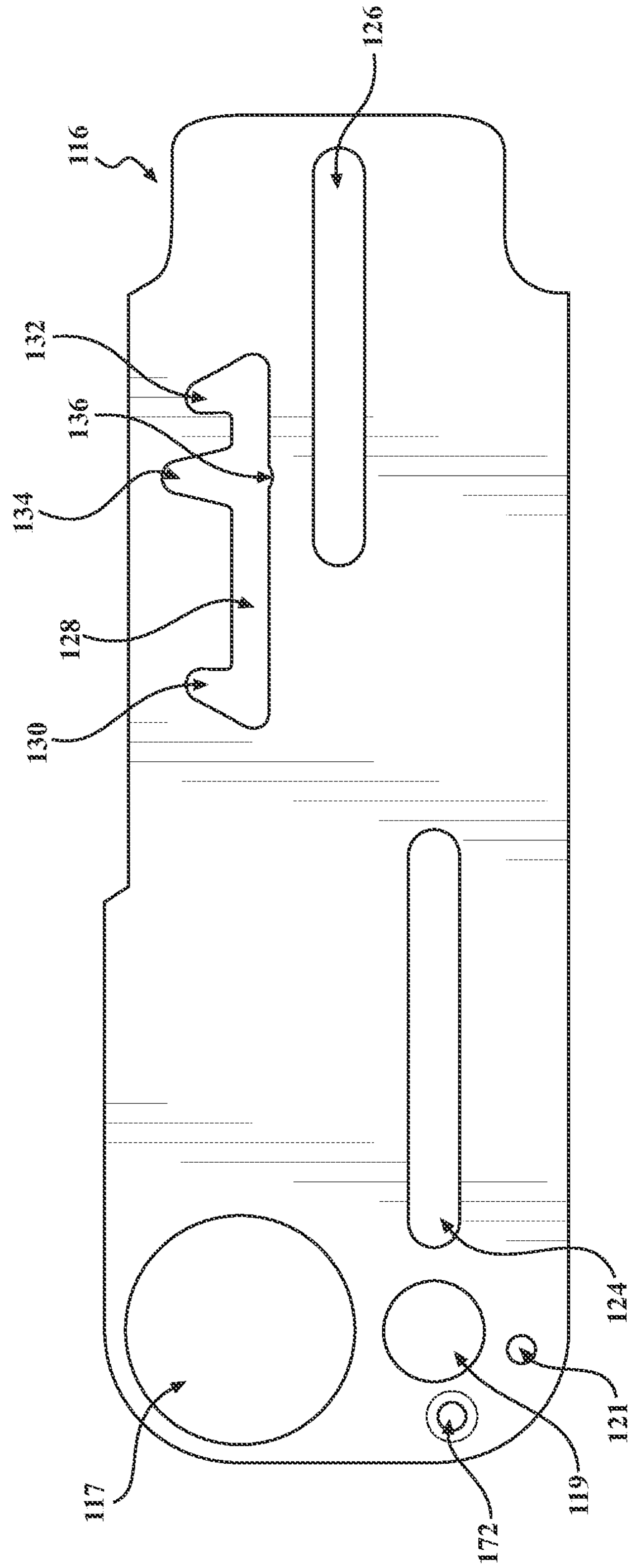
FIG. 8 is a side view of an alternative liner of a retractable utility knife.

An alternative liner 116 is illustrated in FIG. 8. The liner 116 may be formed of a similar material and in a similar manner as first or second liner 16, 18. The liner 116 may be received in a first or second scale 12, 14. The liner 116 includes a control track 128 and is similar to the control track 28. The control track 128 includes a retracted notch 130, at least one extended notch 132, and a removal/replacement notch 134. The notches 130, 132, 134, may taper toward their ends to improve the rigidity between the components, minimizing any rattling or looseness during storage, transportation or use. The control track 128 may further include a locator 136 as a shallow notch disposed opposite the removal/replacement notch 134. The locator 136 provides an indication to a user who is applying pressure to the slider 22 when the control pin 40, in contact with the bottom surface of the control track 128, is positioned in alignment with the removal/replacement notch 134. The locator 136 as a notch may have a substantially shallower depth than the other notches 130, 132, 134. In other alternatives, the locator 136 may be formed other than as a notch, such as a bump, roughened area of the track 128, or other similar feature to provide a tactile response to the user as the slider 22 is moved across the portion of the control track 128 proximate to the removal/replacement notch 134.

The alternative liner 116 includes first and second guide tracks 124 and 126. The guide tracks 124, 126 may be in similar locations or may be located in a different location from guide tracks 24, 26 of the first or second liners 16, 18. The alternative liner 116 may include one or more features 117, 119, 121 that provide a pass-through opening for threaded fasteners 62, 64, 66 that are used to secure the first scale 12 to the second scale 14. The alternative liner 116 may also include a threaded hole 172 for receiving a liner screw 60 to secure the auxiliary tool 24.

Figure 9A:
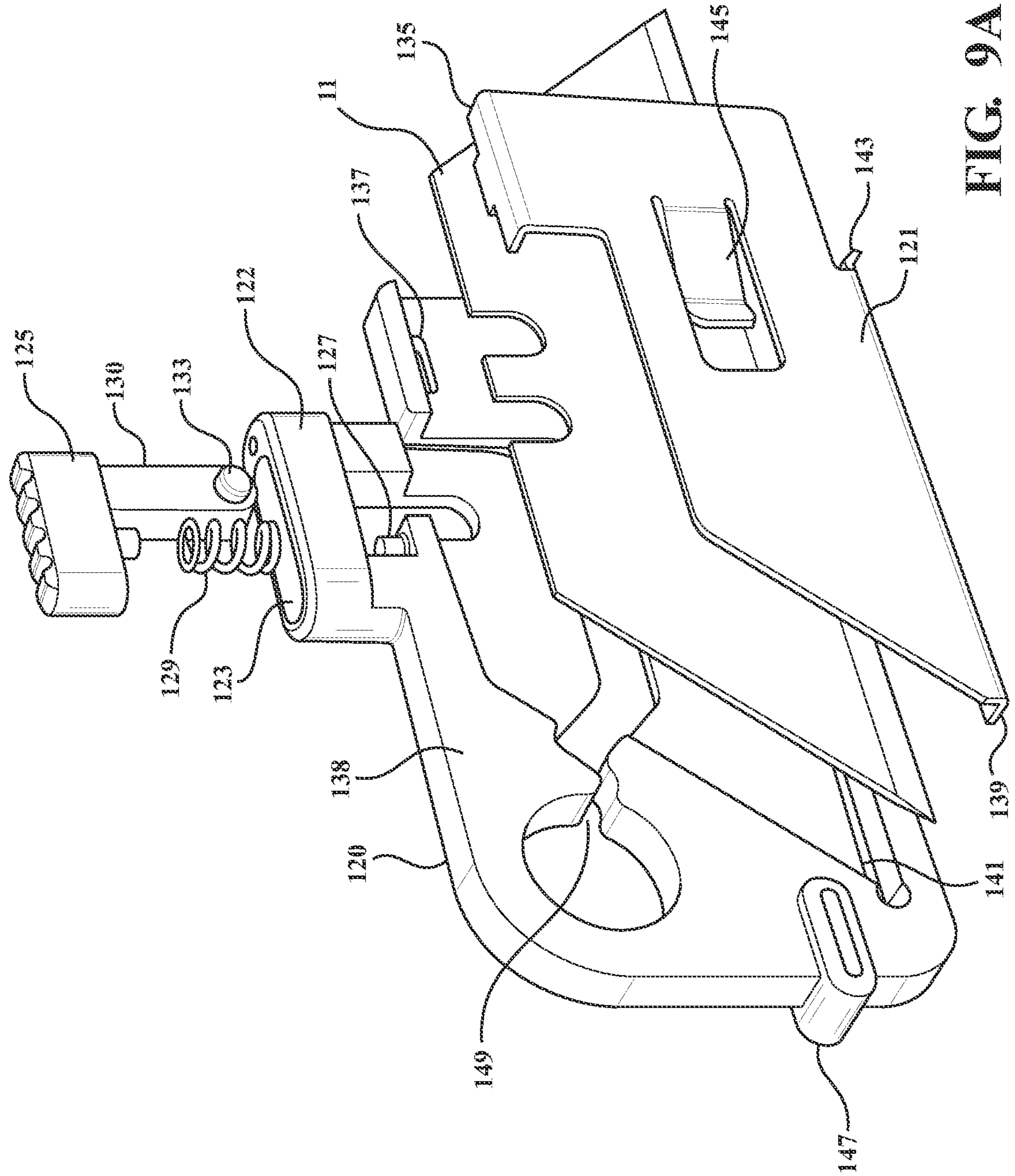
FIG. 9A is an exploded perspective view of an alternative blade carrier and replaceable utility blade of a retractable utility knife.
Figure 9B:
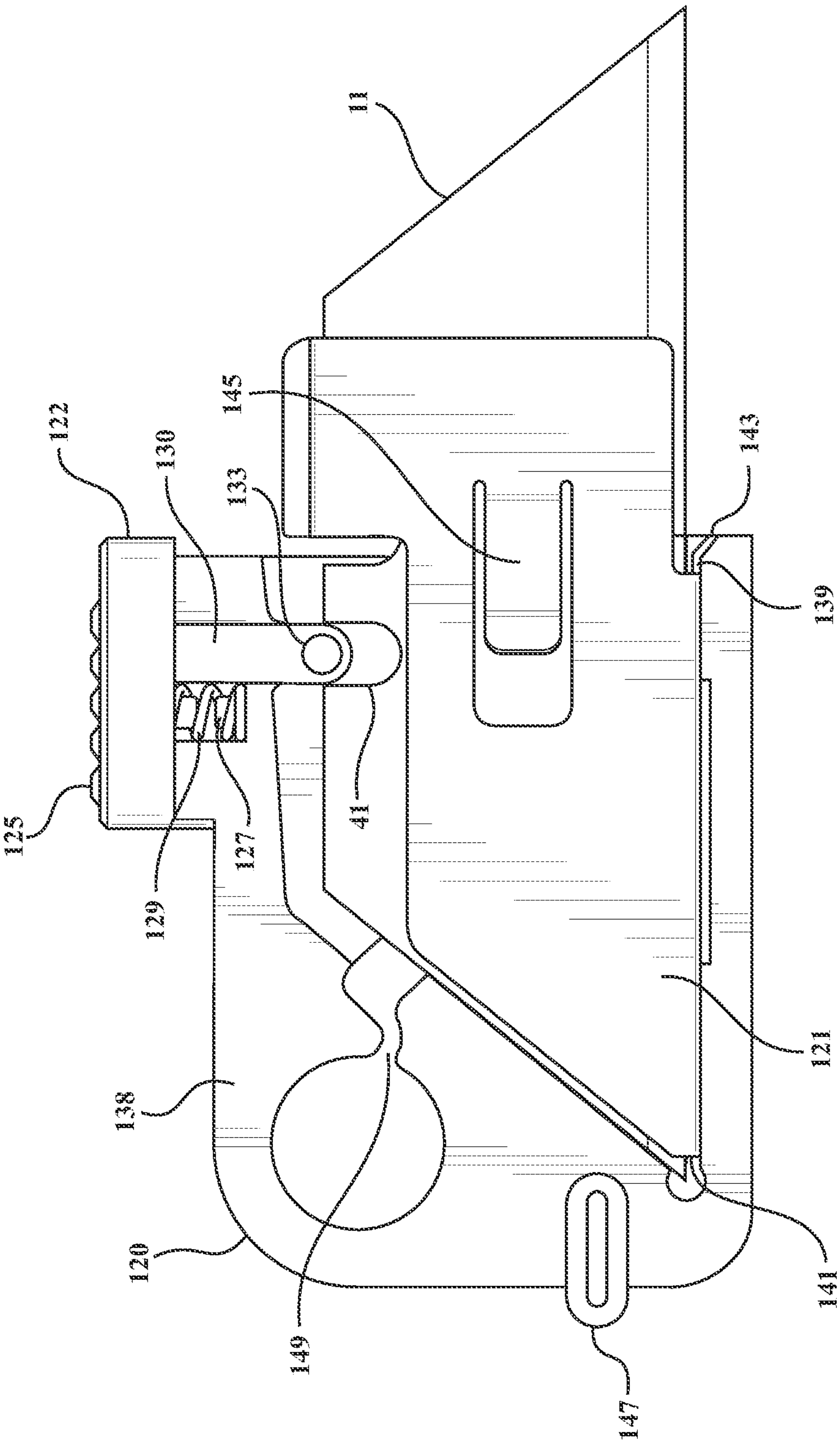
FIG. 9B is a side view of the alternative blade carrier and replaceable utility blade shown in FIG. 9A.

An alternative blade carrier is illustrated in FIGS. 9A and 9B with a replaceable blade 11. The alternative blade carrier is formed as a two piece construction including a main carrier 120 and carrier clip 121. The main carrier 120 may be formed, for example, from plastic, via injection molding. Alternatively, the main carrier 120 may be formed from metal via multi-axis machining. Other materials and manufacturing methods may be suitable as are known in the art. The main carrier 120 may receive a replaceable blade 11 and interface with one or more liners 16, 18, 116. The main carrier 120 includes a spring arm 138 to support on the spring arm a slider 122 for a user to engage and move the carrier relative to liners and scales. The spring arm 138 is formed with an integral hinge allowing the spring arm 138 to deflect with respect to the main carrier 120.

The slider 122 is formed integrally with the spring arm 138 of the main carrier 120. The slider 122 provides a hollow sleeve 123 for receiving a security button 125. Within the hollow sleeve 123 a support post 127 supports a spring 129 arranged to bias against the underside of the security button 125. The security button 125 includes a control post 131 that extends downwards, and once assembled, extends into the blade notch 41. The control post 131 includes one or more trunnions 133 extending from the control post 131 to interface with the control tracks 28, 128 of a liner 16, 18, 116. The trunnions 133 may include a tapered aspect to facilitate installation by inserting the security button 125 into the hollow sleeve 123 and where the trunnions 133 retain the security button 125 in the hollow sleeve 123 of the slider 122.

The main carrier 120 may also include a limit stop 149. The limit stop 149 limits the deflection of the spring arm 138. The limit stop 149 may include complementary features on the spring arm 138 and the main carrier 120 in order to set the maximum deflection of the spring arm 138. Alternatively, the limit stop 149 may be an extension of the spring arm 138 arranged to limit the deflection of the spring arm 138 against a feature (not shown) of the liner 16, 18, 116. It may be desirable to limit the deflection of the spring arm 138 so that the sliders 22, 122 remain above the edge of the first and second scales 12, 14 and the user can maintain control of the blade carrier 120 without losing contact with the slider 122.

The alternative blade carrier includes the carrier clip 121. The carrier clip 121 may be formed of bent sheet metal, or other wear resistant material. The carrier clip 121 may be substantially U-shaped to capture one side and at least a portion of the top and bottom of the replaceable blade 11, including the sharpened edge portion along the bottom of the blade 11. The carrier clip 121 may include a top plate 135 that has an extension to clip into an opening 137 provided on the main carrier 120. The carrier clip 121 may include a bottom plate 139. The bottom plate 139 may be received into a recess 141 formed in the main carrier 120. The recess 141 may include an opening similar to opening 137 for receiving a portion of the bottom plate 139. The bottom plate 139 may also include a lip 143 that extends to protect a leading edge of the main carrier 120 from the corner and sharpened edge of the replaceable blade 11 during removal and installation of the blade 11.

The carrier clip 121 may include a side biasing arm 145 formed integrally with the carrier clip 121. Once assembled, the side biasing arm 145 may urge the blade 11 against the main carrier 120 to minimize any rattling or looseness of the blade 11 in the retractable utility knife 10. The carrier clip 121 may be arranged so that the top plate 135 and the bottom plate 139 apply opposing biases against main carrier 120 to be securely retained in main carrier 120 once assembled.

The alternative blade carrier 120/121 interacts with the liners 16, 18, 116 with one or more guides 147. The one or more guides 147 may be formed integrally with the main carrier 120. Alternatively, the guides 147 may take the form of pins or other extensions press-fit, threaded into, or otherwise affixed to the main carrier 120 or the carrier clip 121. The guides 147 may extend from one or both sides of the main carrier 120, or the carrier clip 121 to be received in the one or more guide tracks 24, 26, 124, 126.

Figure 10A:
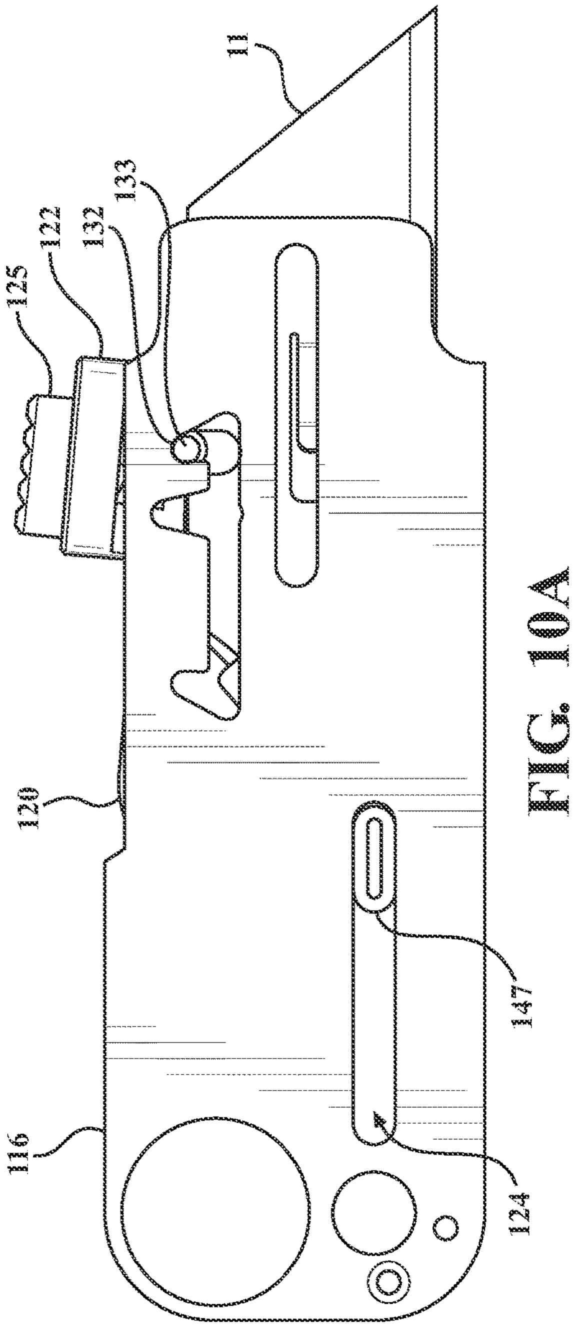
FIG. 10A is a side view of the alternative liner of FIG. 8 and the alternative blade carrier of FIGS. 9A and B in a first configuration.
Figure 10B:
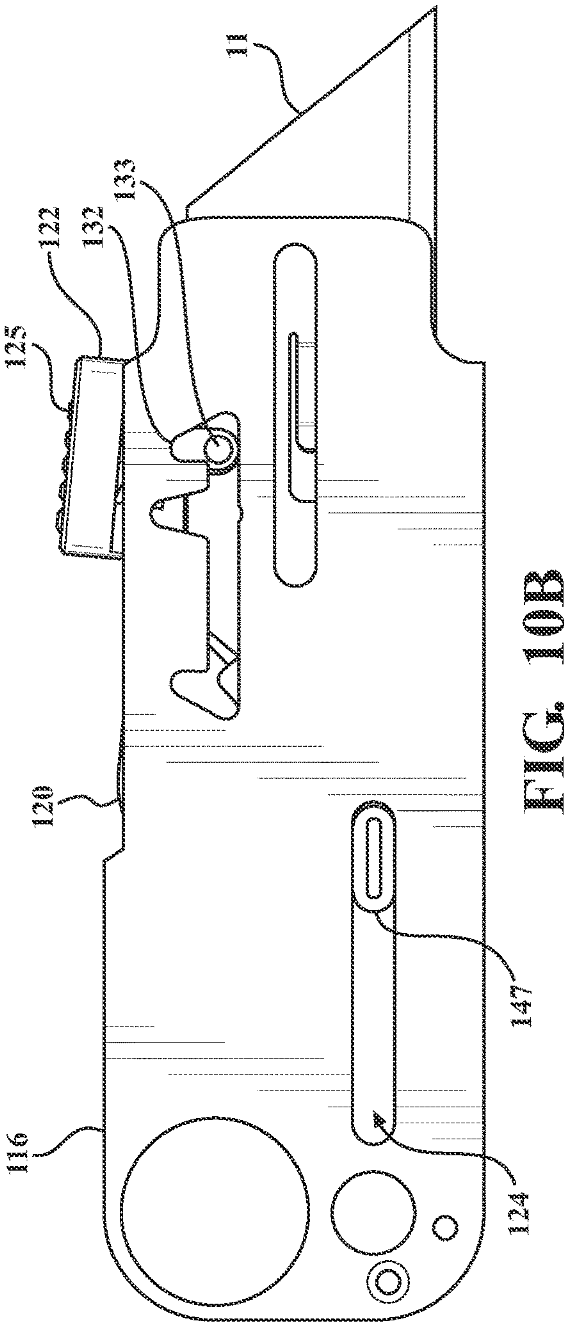
FIG. 10B is a side view of the alternative liner and alternative blade carrier in a second configuration.

The operation of the alternative blade carrier 120/121 is illustrated in FIGS. 10A and 10B in conjunction with the alternative liner 116 shown in FIG. 8. In the configuration shown in FIG. 10A, an offset or oblique force has been applied to deflect the slider 122 downward against the force of the spring arm 138. This applied force may be unintentional, such as during storage or transportation in a pocket and is not aligned to simultaneously apply against the security button 125. The security button 125 thus extends from the slider 122, biased by the spring 129. The trunnions 133 remain in the notch 132, preventing the blade carrier 120/121 from sliding relative to the liner 116. In the configuration illustrated in FIG. 10B, a force has been applied evenly to the slider 122 and the security button 125 so that the trunnion 133 is removed from the notch 132 and the blade carrier 120/121 can slide relative to the liner 116.

Figure 11:
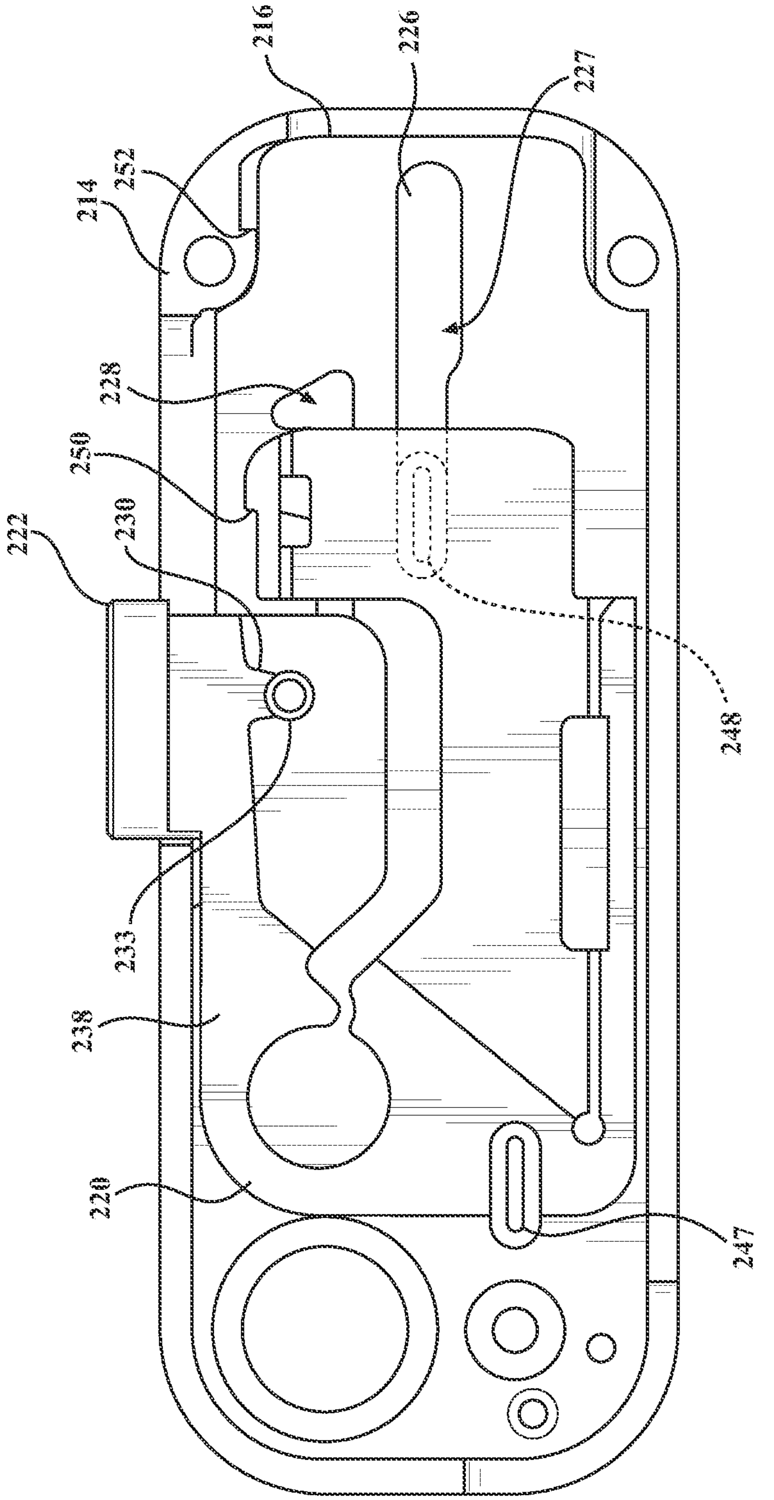
FIG. 11 is a side view of a partially assembled retractable utility knife including an alternative liner and blade carrier in a first configuration.
Figure 12:
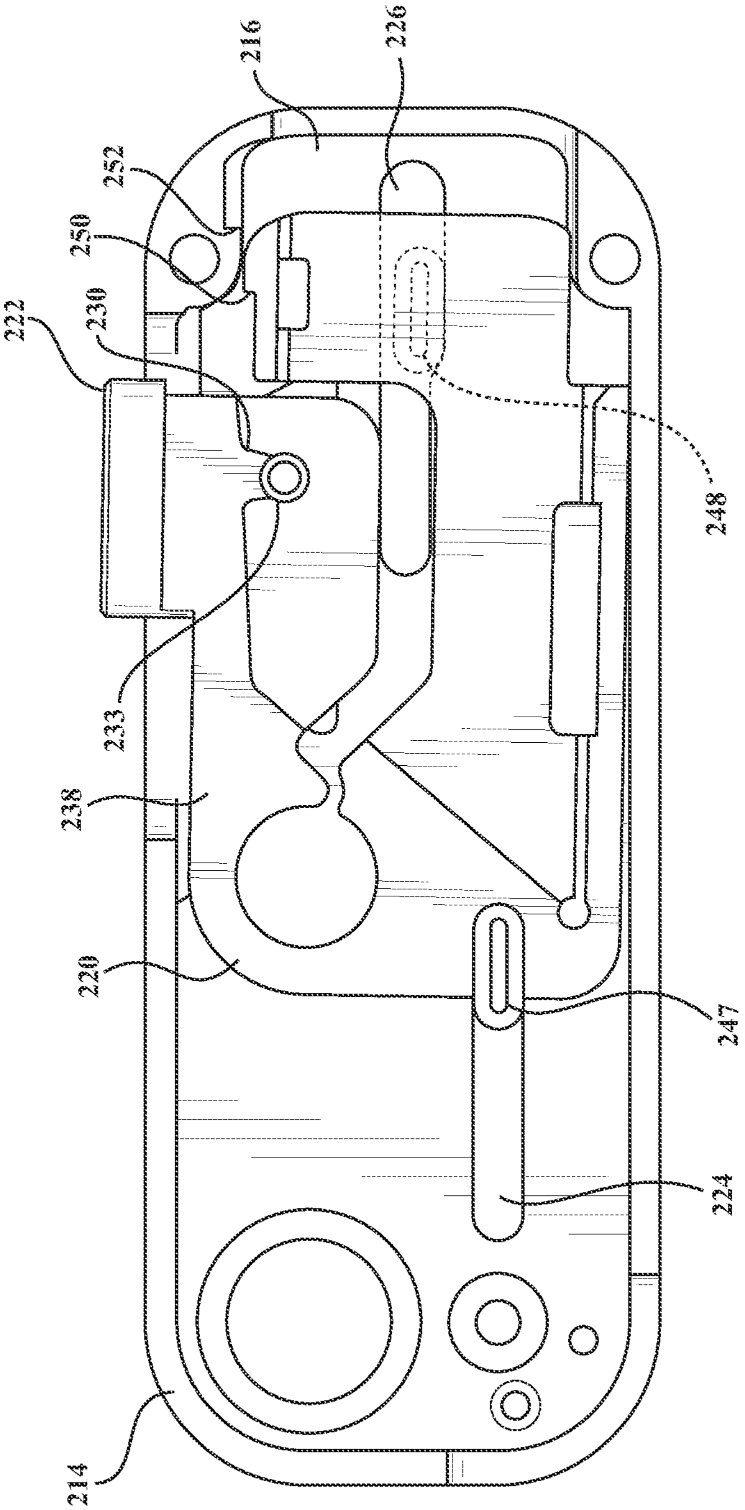
FIG. 12 is a side view of the partially assembled retractable utility knife including the alternative liner and blade carrier of FIG. 11 in a second configuration.
Figure 13:
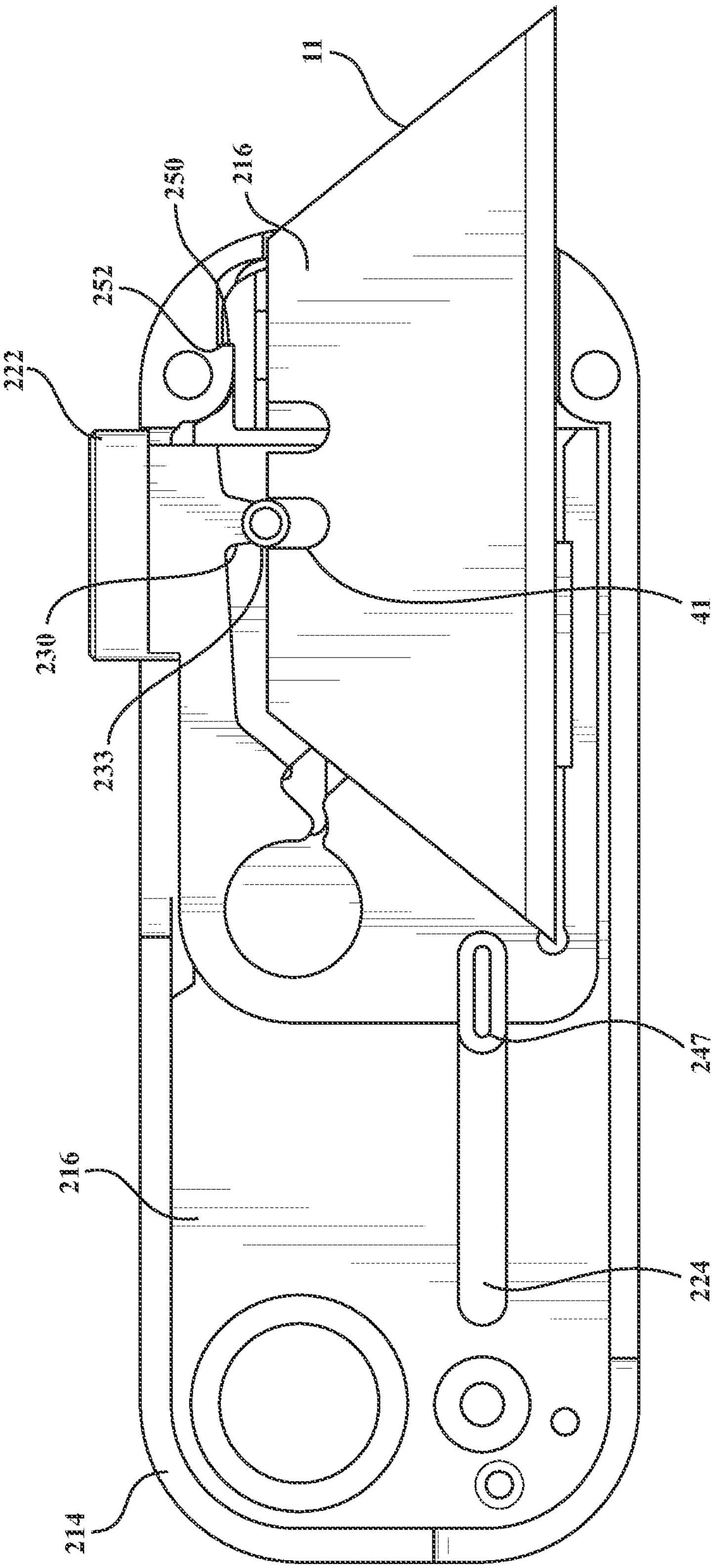
FIG. 13 is a side view of the partially assembled retractable utility knife including the alternative liner and blade carrier of FIG. 11 in a third configuration.

A further alternative arrangement is illustrated in FIGS. 11-13. A blade carrier 220 is illustrated with a first liner 216 and first scale 214 in multiple configurations transitioning from a fully-retracted position to a fully deployed position. The blade carrier 220 may be used in conjunction with a carrier clip 121 (not shown in FIGS. 11-13). The blade carrier 220 includes a spring arm 238 supporting a slider 222. The blade carrier 220 includes an integral control post 230 supported on the spring arm 238 with a control pin 233 press fit through the control post 230. The control post 230 may include a tapered profile to better secure into the blade notch 41 to minimize rattling of the replaceable blade 11 during storage or transportation. The blade carrier 220 and liner 216 include other features similar to the blade carrier 120 and liner 116, including, for example, control track 128, 228, a guide track 124, 224 and guide 147, 247.

The blade carrier 220 includes a first hook portion 250 for engaging with a second hook portion 252 of the first scale 214. The first and second hook portions 250, 252 secure against each other when the blade 11 is in the fully deployed position and provide additional resistance to prevent the blade carrier 220 from retracting into the retractable utility knife 10 when a force is applied against the blade 11 during cutting. The blade carrier 220 includes a guide 248 or guide pin, similar to the guide 147 or guide pin 44, to engage with the guide track 226 of the liner 216. The guide track 226 may include a curved or slanted path, where guide 248 is a circular pin, or else may be an enlarged portion 227, where guide 248 has an elongated aspect, to accommodate the downward rotation of the blade carrier 220 required for the first hook portion 250 to transition past the second hook portion 252 when the blade carrier 220 is advanced toward the fully deployed position. Although illustrated on the blade carrier 220, the first hook portion 250 may be provided on the carrier clip 121. Similarly, the second hook portion 252, illustrated on the first scale 214, may also be provided on a second scale (not illustrated in FIGS. 11-13, but formed to mirror first scale 214 in the same way as first and second scales 12, 14 illustrated in FIG. 7). Alternatively, the second hook portion 252 may be provided on the liners 16, 18, 116, 118.

Figure 14:
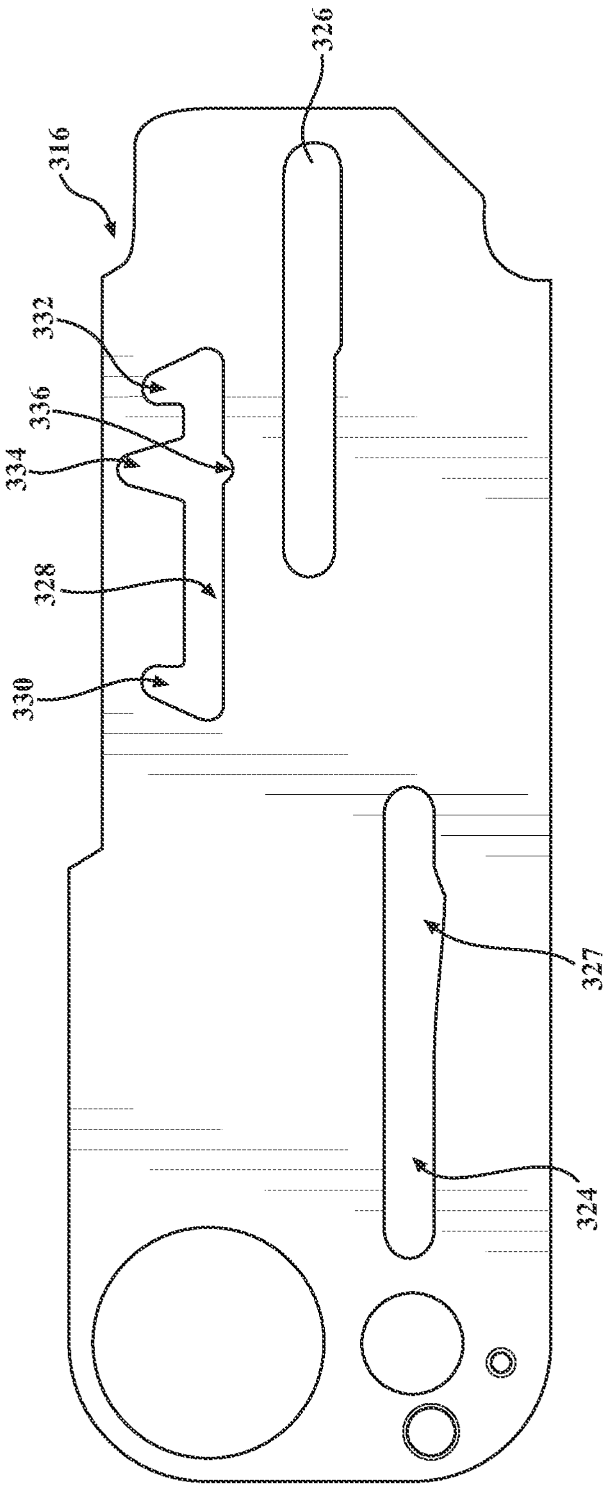
FIG. 14 is a side view of an alternative liner of a retractable utility knife.

Another alternative liner 316 is illustrated in FIG. 14. The liner 316 may be formed of a similar material and in a similar manner, and operates similarly as the other described liners, 16, 18, 116, 216. The liner 316 includes a control track 328, similar to control track 128, 228 with similar retracted notch 330, extended notch 332, removal/replacement notch 334, and locator 336. The liner 316 includes a front guide track 326, similar to the guide track 226 having the enlarged portion 227. The liner 316 also includes a rear guide track 324 that has an enlarged portion 327. The enlarged portion 327 of the rear guide track 324 operates similarly as the enlarged portion of the front guide track, allowing the blade carrier to pivot with respect to the liner as it transitions between configurations.

Figure 15B:
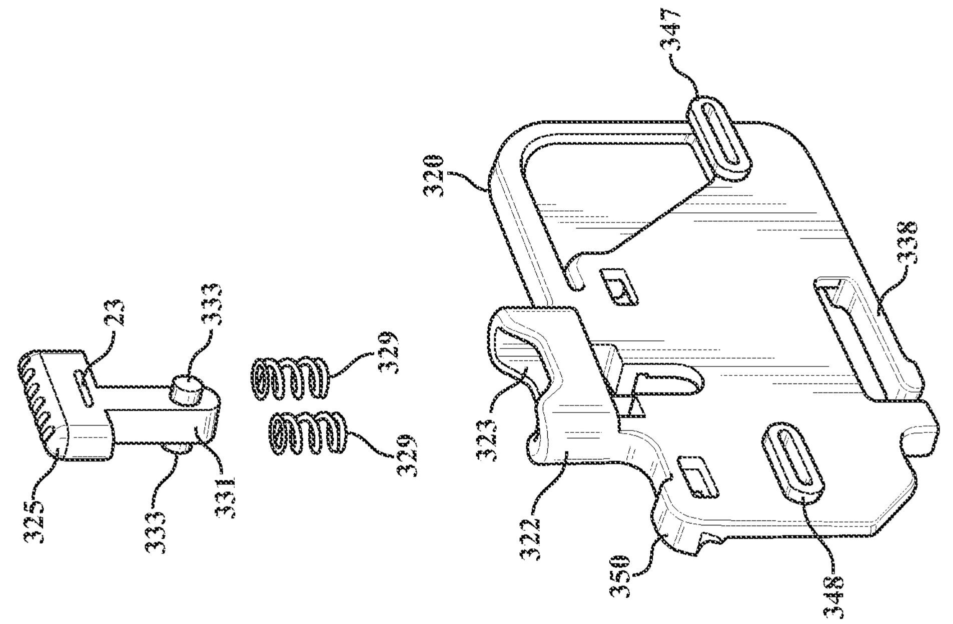
FIG. 15B is an exploded perspective view of the alternative blade carrier of FIG. 15A from a second perspective.
Figure 15A:
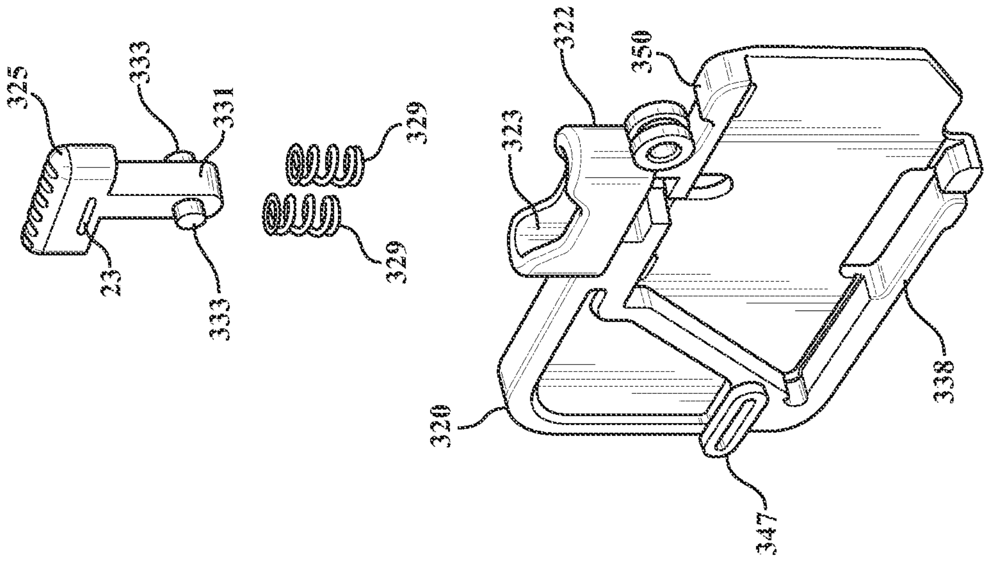
FIG. 15A is an exploded perspective view of an alternative blade carrier from a first perspective.

A blade carrier 320 is illustrated in two configurations in FIGS. 15A and 15B from two different perspectives. The blade carrier 320 is adapted for use with the alternative liner illustrated in FIG. 14. The blade carrier 320 is also adapted for use with a carrier clip 321 (not illustrated in FIGS. 15A/B), similar to the carrier clip 121. The blade carrier 320 includes a slider 322 by which the user can toggle the retractable utility knife between different configurations.

The slider 322 defines a hollow sleeve 323 for receiving a security button 325. The security button 325 includes a control post 331. The control post 331 includes one or more trunnions 333 extending from the control post 331 to interface with, for example, the control track 328. The security button 331 may be biased upwards relative to the blade carrier 320 by one or more springs 329 arranged to bias against the underside of the security button 325. The one or more springs 329 may be supported by the slider 322 within the hollow sleeve 323. The security button 325 may also include an indicator 23, as described above, to communicate to the user when the blade carrier 320 is positioned for removal and replacement of the replaceable blade and the control post has been withdrawn from the notch 41 of the replaceable blade 11.

The blade carrier 320 includes a first hook portion 350 for engaging with a second hook portion of a scale. The first hook portion 350 the blade carrier 320 is similar to the first hook portion 250 of the blade carrier 220 and operates in a similar way. Unlike the blade carriers 20, 120, 220 described above, the blade carrier 320 includes a spring arm 338 that extends along the bottom of the blade carrier 320. Once assembled, the spring arm 328 biases the rest of the blade carrier 320, including slider 322, upward relative the one or more liners, such as liner 316, and scales that comprise the retractable utility knife. The spring arm 338 may bias against an interior surface of one or both of the scales that enclose the blade carrier 320.

The blade carrier 320 is forced downwards against the bias of the spring arm by the user to advance the blade carrier 320 into the fully deployed configuration, while simultaneously depressing the security button 325 to disengage the trunnions 333 from one of notches along the control track. Forcing the blade carrier 320 downward allows the first hook portion 350 to pass beyond the second hook portion of the scale. The enlarged portions of the first and second guide tracks 324, 326 allow the guides 347, 348 to deflect downward as the first hook portion 350 passes the second hook portion 352.

Figure 16:
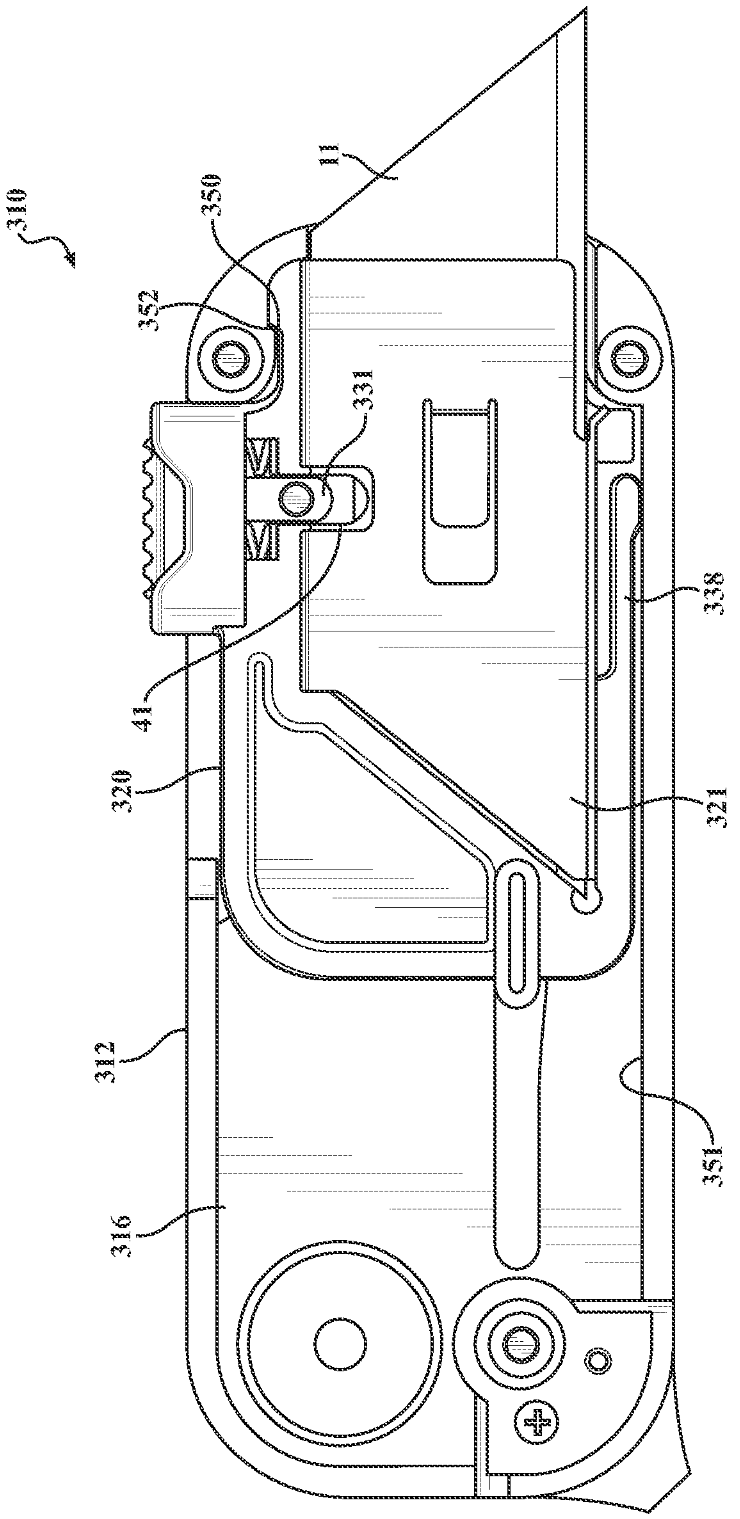
FIG. 16 is a side view of a partially assembled retractable utility knife including the alternative liner of FIG. 14 with the blade carrier of FIGS. 15A/B in a first configuration.
Figure 17:
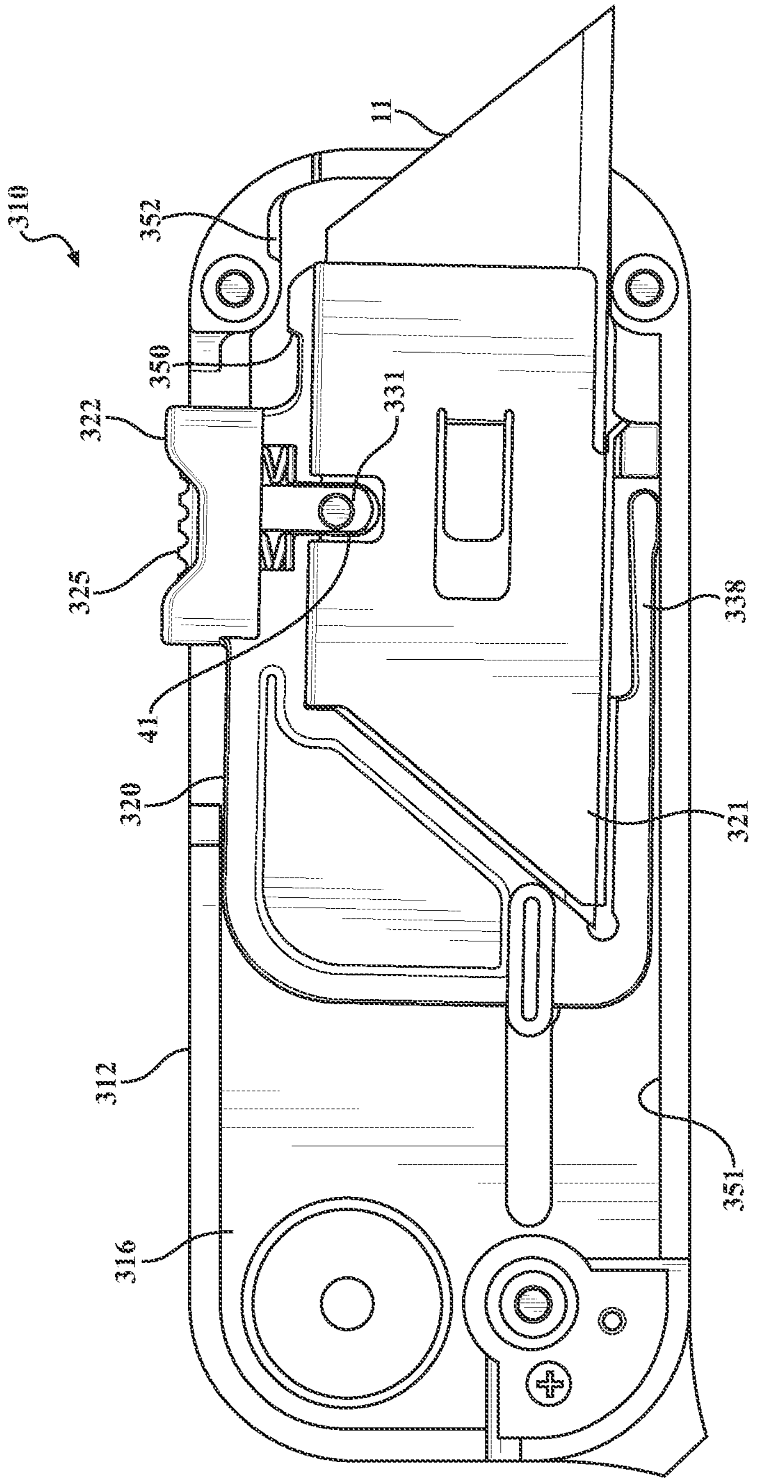
FIG. 17 is a side view of the partially assembled retractable utility knife of FIG. 16 in a second configuration.

FIGS. 16 and 17 illustrate the operation of the retractable utility knife 310 in a partially assembled state with a first scale 312, the liner 316, the blade carrier 320, including a replaceable blade 11, and carrier clip 321. In FIG. 16, the blade carrier 320 is positioned in the fully deployed configuration. The first hook portion 350 is engaged with the second hook portion 352 of the first scale 312. The control post 331 extends into the blade notch 41 retaining the blade 11 to blade carrier 320, and the trunnion 333 extends into the deployed notch 332 of the control track 328 of the liner 316.

FIG. 17 illustrates the operation of retractable utility knife 10 at the point where first hook portion 350 of the blade carrier 320 moves past the second hook portion 352 of the scale 312. The main body of the blade carrier 320 rotates downward to allow the hook portions to pass. The user deflects the blade carrier 320 by depressing the securing button 325 and pressing against the slider 322. The enlarged portions of the front and rear guide tracks 324, 326 accommodate this deflection of the blade carrier 320. The spring arm 338 maintains a bias against an interior surface 351 of the scale 312 to urge the blade carrier 320 back to its parallel orientation with respect to the liner 316 and scale 312 once the first and second hook portions pass.

Figure 18:
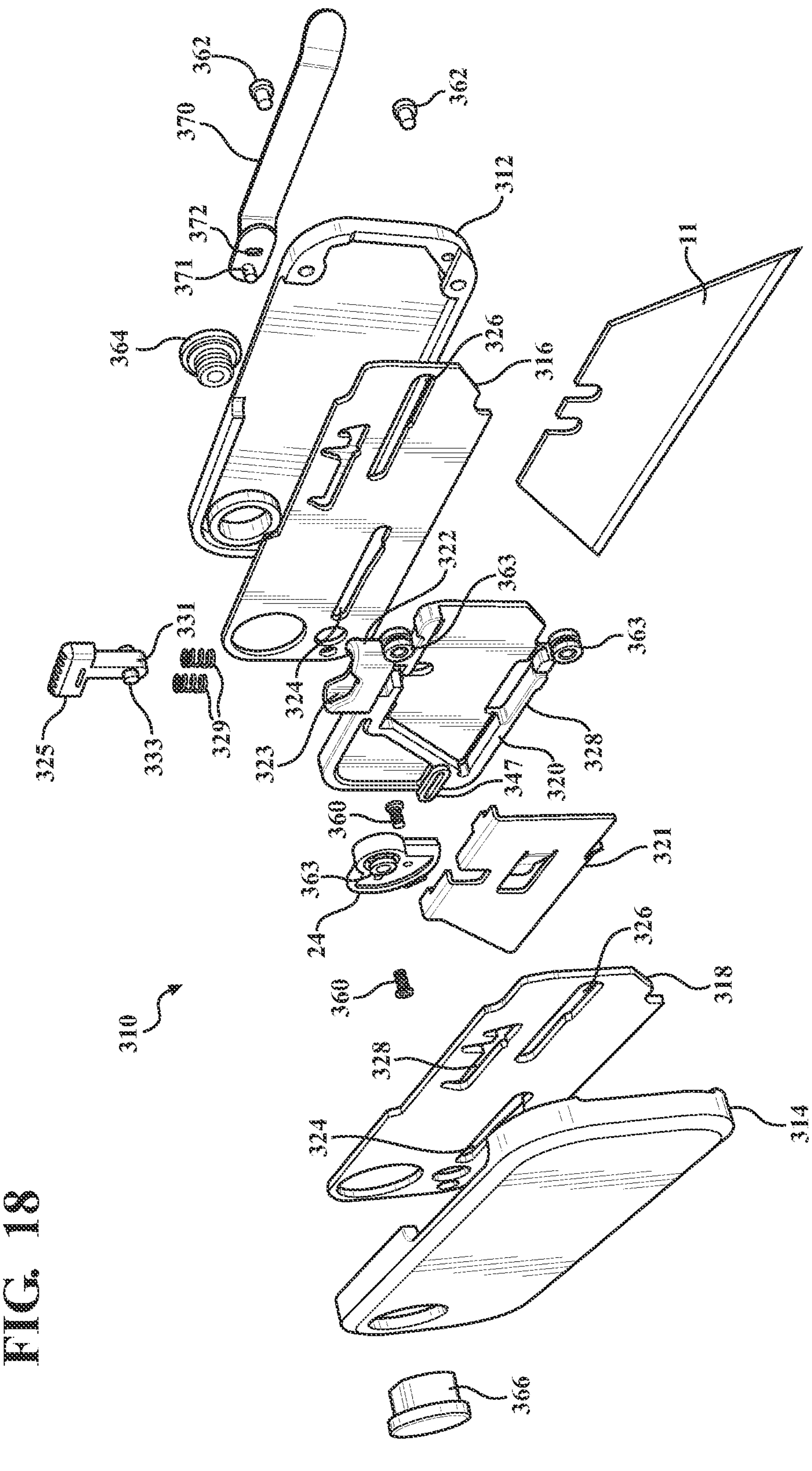
FIG. 18 is an exploded perspective view of a retractable utility knife including the alternative liner of FIG. 14 and the alternative blade carrier of FIGS. 15A/B.

FIG. 18 illustrates an exemplary retractable utility knife 310 in an exploded assembly according to the disclosed alternatives. The retractable utility knife 310 includes first and second scales 312, 314 forming the outer housing and handle of the retractable utility knife 310. Within an interior volume defined by the first and second scales 312, 314, first and second liners 316, 318 include respective control tracks 328, rear guide tracks 324, and front guide tracks 326. The control tracks 328, and guide tracks 324, 326 interface with the blade carrier 320. The blade carrier 320 includes guides 347 and 348 arranged to extend into the respective guide tracks 324, 326 of the first and second liners 316, 318. The blade carrier includes a security button 325 disposed in the hollow sleeve 323 of the slider 322 and resiliently supported on springs 329. The security button 325 is supported on the control post 331 and includes trunnions 333 for extending into the respective control tracks 328. A replaceable blade 11 is received in the blade carrier 320 and captured to the blade carrier by the carrier clip 321.

The retractable utility knife 310 is assembled using threaded fasteners in the illustrated alternative, but other methods are possible. Similar to the alternative illustrated in FIG. 7, a first end of the scales 312, 314 are secured using a pass-through fastener arrangement including a bolt 364 and nut 366, each including a pass-through opening, for receiving a lanyard or similar attachment, and each having an internal hex pocket for tightening.

The retractable utility knife 310 includes an auxiliary tool 24 that may be included to act as a spacer between the liners 316, 318 and may be secured via oppositely arranged fasteners 360 passing through one liner 316, 318 and being received in a threaded hole in the other liner 316, 318.

Threaded inserts 363 may be molded-in to one of the scales 312, 314 to provide a secure threaded insert for receiving assembly screws 362 through the other of the scales 312, 314. In this way, at least one outer surface of the retractable utility knife 310 can have a smooth face free from exposed fasteners. Alternatively, threaded inserts may be pressed-in, or secured through heat, ultrasonic or adhesive means.

A belt clip 370 may also be provided on the retractable utility knife 310. The belt clip 370 may include a locator pin 371 for being received in an opening of the scale 312. An assembly screw 362 may pass through an opening of the belt clip 372, and an opening of the first scale 312 to secure to the threaded insert 363 that may be disposed adjacent to the auxiliary tool 24.

While specific configurations of the retractable utility knife 10 have been described above with regard to Figures, it will be understood that various alternatives and modifications may be made without departing from the scope of the disclosure.

Furthermore, it will be understood that the above description is provided as an illustrative description and is not intended to be limiting. For example, various components are described and illustrated as separate components that may be assembled together. It will be understood that combining separate components into a single integral unit or separating a single component into multiple discrete units may nevertheless be consistent with the above description. Specifically, the features described with respect to the liners 16, 18 may be provided in the scales 12, 14 such that a first scale 12 and a first liner 16 are manufactured as a single integrated component. Said differently, the control track 28 and guide tracks 24, 26 may be provided on the scale to interface with the carrier, and the assembly would thus exclude the liner as a separate component. Similarly, the carrier 20 is illustrated as a single integral unit incorporating the slider spring arm 38, side biasing arm 48, rear biasing arm 56, and first and second side plates 52, 54. An alternative example would include each of these components being fabricated separately and thereafter assembled via conventional methods. Further variation is contemplated with the disclosure of alternative configurations of the several components. Consistent with the above description, multiple features of the alternative configurations may be included within a single execution of the retractable utility knife 10, or may be embodied exclusive of other features described in combination in the above description.

Further variation will be appreciated wherein interacting features of components are reversed relative to which component provides the feature. For example, the above description describes that the carrier 20 includes a control pin 40 and guide pins 42, 44, 46 while the liners include the control track 28 and guide tracks 24, 26. An alternative consistent with this description includes the carrier defining a control track and guide tracks, while the liners include a control pin and guide pins. The above description and these examples of variations are not intended to be an exhaustive list and other variations are possible within the scope of teaching provided herein.

What is claimed is:

1. A retractable utility knife comprising:

a first liner comprising a control track extending along the first liner, the control track comprising a first notch having a first depth at a first end of the control track and a second notch having a second depth spaced apart from the first notch along the control track;

a carrier arranged to receive a replaceable blade, the carrier slidable relative to the liner between a first configuration and a second configuration, the carrier comprising a spring arm and a control pin, the control pin extending into the control track; and a first scale and a second scale, the first and second scale together encompassing an interior volume, wherein the first liner and the carrier are disposed within the interior volume;

wherein the spring arm is arranged to bias the control pin into the first notch in the first configuration, and to bias the control pin into the second notch in the second configuration, wherein the control track comprises a third notch disposed along the control track spaced from the first notch and the second notch, the third notch having a third depth greater than the first depth and the second depth, and wherein the third notch is disposed between the first notch and the second notch longitudinally along the control track, and wherein the spring arm is arranged to bias the control pin into the third notch in a third configuration, different from the first configuration and the second configuration.

2. The retractable utility knife of claim 1, wherein the first configuration is a retracted configuration; the second configuration is a deployed configuration; and the third configuration is a removal/replacement configuration.

3. The retractable utility knife of claim 1, wherein the carrier further comprises a slider supported on the spring arm, and the slider is engageable by a user to act against the force of the spring arm.

4. The retractable utility knife of claim 1, wherein the liner comprises at least one guide track; and the carrier comprises at least one guide, wherein the at least one guide extends into the at least one guide track.

5. The retractable utility knife of claim 1, wherein the carrier comprises one or more of a side biasing arm arranged to bias against the side of the replaceable blade; at least one side plate for limiting the sideways movement of the blade relative to the carrier; a rear biasing arm arranged to bias against a rear face of the replaceable blade, or combinations thereof.

6. The retractable utility knife of claim 1, further comprising a replaceable blade, the replaceable blade having a sharpened edge and a blade notch opposite the sharpened edge.

7. The retractable utility knife of claim 6, wherein the control pin extends through the blade notch when the carrier is positioned in the first configuration or the second configuration.

8. The retractable utility knife of claim 7, wherein the control pin is removed from the blade notch when the control pin is received in the third notch.

9. The retractable utility knife of claim 8, wherein the carrier further comprises a slider supported on the spring arm, and the slider is engageable by a user to act against the force of the spring arm, the slider comprising an indicator, wherein the indicator is concealed by the first scale and the second scale when the carrier is in the first configuration or the second configuration, and the indicator is exposed when the control pin is received in the third notch, and wherein the indicator comprises a visual or tactile feature.

10. The retractable utility knife of claim 9, wherein the slider comprises a circumscribing groove, and wherein the indicator comprises a resilient insert disposed in the groove.

11. The retractable utility knife of claim 1, further comprising a second liner disposed adjacent the carrier opposite the first liner.

12. The retractable utility knife of claim 11, wherein the second liner comprises a second control track parallel the control track of the first liner; wherein the control pin further extends into the second control track.

13. The retractable utility knife of claim 12, wherein the first and second liners each comprise at least one guide track, and wherein the carrier comprises at least one guide to engage with each of the at least one guide tracks of the first and second liners.

14. The retractable utility knife of claim 11, further comprising an auxiliary tool secured between the first and second liners, wherein a thickness of the auxiliary tool between the first and second liner is at least equal to a thickness of the carrier.

15. The retractable utility knife of claim 14, wherein the auxiliary tool comprises one of a screwdriver blade, a prying edge, a chisel edge, or combinations thereof.

* * * * *